US008593966B2

(12) United States Patent
Lansing et al.

(10) Patent No.: US 8,593,966 B2
(45) Date of Patent: *Nov. 26, 2013

(54) METHOD FOR DROPPING LOWER PRIORITY PACKETS THAT ARE SLATED FOR WIRELESS TRANSMISSION

(75) Inventors: Shane Lansing, Mission Viejo, CA (US); Niki Pantelias, Duluth, GA (US); Young Vu, Irvine, CA (US); Francisco J. Gomez, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/018,411

(22) Filed: Jan. 31, 2011

(65) Prior Publication Data

US 2011/0141957 A1 Jun. 16, 2011

Related U.S. Application Data

(63) Continuation of application No. 11/889,966, filed on Aug. 17, 2007, now Pat. No. 7,881,202, which is a continuation of application No. 10/253,659, filed on Sep. 25, 2002, now Pat. No. 7,839,785.

(60) Provisional application No. 60/324,892, filed on Sep. 27, 2001.

(51) Int. Cl.
*H04L 12/28* (2006.01)

(52) U.S. Cl.
USPC ............ 370/235; 370/310; 370/389; 370/412

(58) Field of Classification Search
None
See application file for complete search history.

(56) References Cited

U.S. PATENT DOCUMENTS

| 5,721,833 A | 2/1998 | Cooperman et al. |
| 5,724,358 A | 3/1998 | Headrick et al. |

(Continued)

FOREIGN PATENT DOCUMENTS

| EP | 0 829 986 A1 | 3/1998 |
| WO | WO 00/76265 A1 | 12/2000 |

OTHER PUBLICATIONS

International Search Report Issued Dec. 16, 2002, for Application No. PCT/US02/30523, 5 pages.

(Continued)

*Primary Examiner* — Chi Pham
*Assistant Examiner* — Shick Hom
(74) *Attorney, Agent, or Firm* — Sterne, Kessler, Goldstein & Fox P.L.L.C.

(57) ABSTRACT

A method for dropping lower priority packets for transmission over a wireless communication medium is provided. A central device receives one or more packets to be transferred to one or more data providers, each packet having a priority. Then, based on the priority, a media access controller stores each of the packets in one or more priority queues in a fixed shared memory space in such a way as to maintain the order in which the packets were received in each of the priority queues. The media access controller monitors the number of packets in each of the priority queues and signals an interrupt when a packet threshold is exceeded in one or more of the priority queues. The media access controller then drops lower priority packets in the fixed shared memory space based on the order received to guarantee that there is enough memory to store higher priority packets in the fixed shared memory space.

17 Claims, 6 Drawing Sheets

(56) References Cited

U.S. PATENT DOCUMENTS

| | | | |
|---|---|---|---|
| 5,818,845 A | 10/1998 | Moura et al. | |
| 5,828,653 A | 10/1998 | Goss | |
| 5,838,915 A | 11/1998 | Klausmeier et al. | |
| 5,901,147 A | 5/1999 | Joffe | |
| 5,938,749 A | 8/1999 | Rusu et al. | |
| 6,067,301 A | 5/2000 | Aatresh | |
| 6,067,457 A | 5/2000 | Erickson et al. | |
| 6,091,709 A | 7/2000 | Harrison et al. | |
| 6,141,323 A | 10/2000 | Rusu et al. | |
| 6,188,698 B1 | 2/2001 | Galand et al. | |
| 6,256,315 B1 | 7/2001 | Barbas et al. | |
| 6,282,208 B1 | 8/2001 | Bowcutt et al. | |
| 6,304,552 B1 | 10/2001 | Chapman et al. | |
| 6,563,793 B1 | 5/2003 | Golden et al. | |
| 6,611,522 B1 | 8/2003 | Zheng et al. | |
| 6,804,492 B2 | 10/2004 | Kay | |
| 6,885,659 B2 | 4/2005 | Aoyagi et al. | |
| 6,944,678 B2 | 9/2005 | Lu et al. | |
| 7,073,055 B1 | 7/2006 | Freed et al. | |
| 7,839,785 B2 * | 11/2010 | Lansing et al. | 370/235 |
| 7,881,202 B2 * | 2/2011 | Lansing et al. | 370/235 |
| 2002/0021701 A1 | 2/2002 | Lavian et al. | |
| 2002/0147011 A1 | 10/2002 | Kay | |
| 2002/0198850 A1 | 12/2002 | Grande et al. | |
| 2003/0007485 A1 | 1/2003 | Venkitaraman et al. | |
| 2003/0058795 A1 | 3/2003 | Lansing et al. | |
| 2003/0081546 A1 | 5/2003 | Agrawal et al. | |
| 2003/0161311 A1 | 8/2003 | Hiironniemi | |
| 2003/0225903 A1 | 12/2003 | Lodha | |
| 2008/0037429 A1 | 2/2008 | Lansing et al. | |

OTHER PUBLICATIONS

European Search Report for Application No. 02778342.2-2416 based on PCT/US02/30523 mailed Feb. 25, 2010, 3 pages.

* cited by examiner

METHOD FOR DROPPING LOWER PRIORITY PACKETS THAT ARE SLATED FOR WIRELESS TRANSMISSION

CROSS REFERENCE TO RELATED APPLICATIONS

This application is a continuation of U.S. Patent Application No. 11/889,966 (now U.S. Pat. No. 7,881,202), filed Aug. 17, 2007, which is a continuation of U.S. patent application Ser. No. 10/253,659 (now U.S. Pat. No 7,839,785), filed Sep. 25, 2002, which claims the benefit of U.S. Provisional Application No. 60/324,892, filed Sep. 27, 2001, all of which are incorporated herein by reference in their entireties.

BACKGROUND OF THE INVENTION

1. Field of the Invention

The present invention is generally related to increasing the efficiency of memory space by dropping lower priority packets that are slated for transmission via a communication medium.

2. Related Art

The importance to the modern economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide communications on cable networks. In general, a user connects a cable modem to the TV outlet for his or her cable TV, and the cable TV operator connects a cable modem termination system (ACMTS@) in the operator=s headend. The CMTS is a central device for connecting the cable network to a data network like the Internet. The CMTS is a central distribution point for a cable system. Data flows Adownstream@ from the CMTS to the cable modem (i.e., downstream communication). Alternatively, data flows Aupstream@ from the cable modem to the CMTS (i.e., upstream communication).

A common cable modem standard today is the Data Over Cable Service Interface Specification (ADOCSIS@). DOCSIS defines technical specifications for both cable modems and CMTS. In DOCSIS, packets are slated for transmission to the data provider via downstream communication by storing the packets in memory. Different types of data have different priorities. These different priorities determine the order in which the packets are sent to the data provider. For example, voice data cannot tolerate delay in transmission and thus is given a higher priority over other types of data that can tolerate delay (e.g., data involved in web surfing). Thus, at times lower priority packets back up due to the CMTS receiving higher priority packets before the CMTS can send the lower priority packets to their respective data provider. This backup tends to fill up the memory that is allocated to store the packets. Therefore, what is needed is a way of dropping the oldest and lowest priority packets when memory becomes too full.

BRIEF SUMMARY OF THE INVENTION

The present invention is a method for dropping low priority packets that are slated for transmission to a cable modem. A central device receives one or more packets to be transferred to one or more data providers, each packet having a priority. Then, based on the priority, a media access controller stores each of the packets in one or more priority queues in a fixed shared memory space in such a way as to maintain the order in which the packets were received in each of the priority queues. The media access controller monitors the number of packets in each of the priority queues and signals an interrupt when a packet threshold is exceeded in one or more of the priority queues. The media access controller then drops lower priority packets in the fixed shared memory space based on the order received to guarantee that there is enough memory to store higher priority packets in the fixed shared memory space.

BRIEF DESCRIPTION OF THE DRAWINGS/FIGURES

The present invention will be described with reference to the accompanying drawings, wherein.

Figure 3:
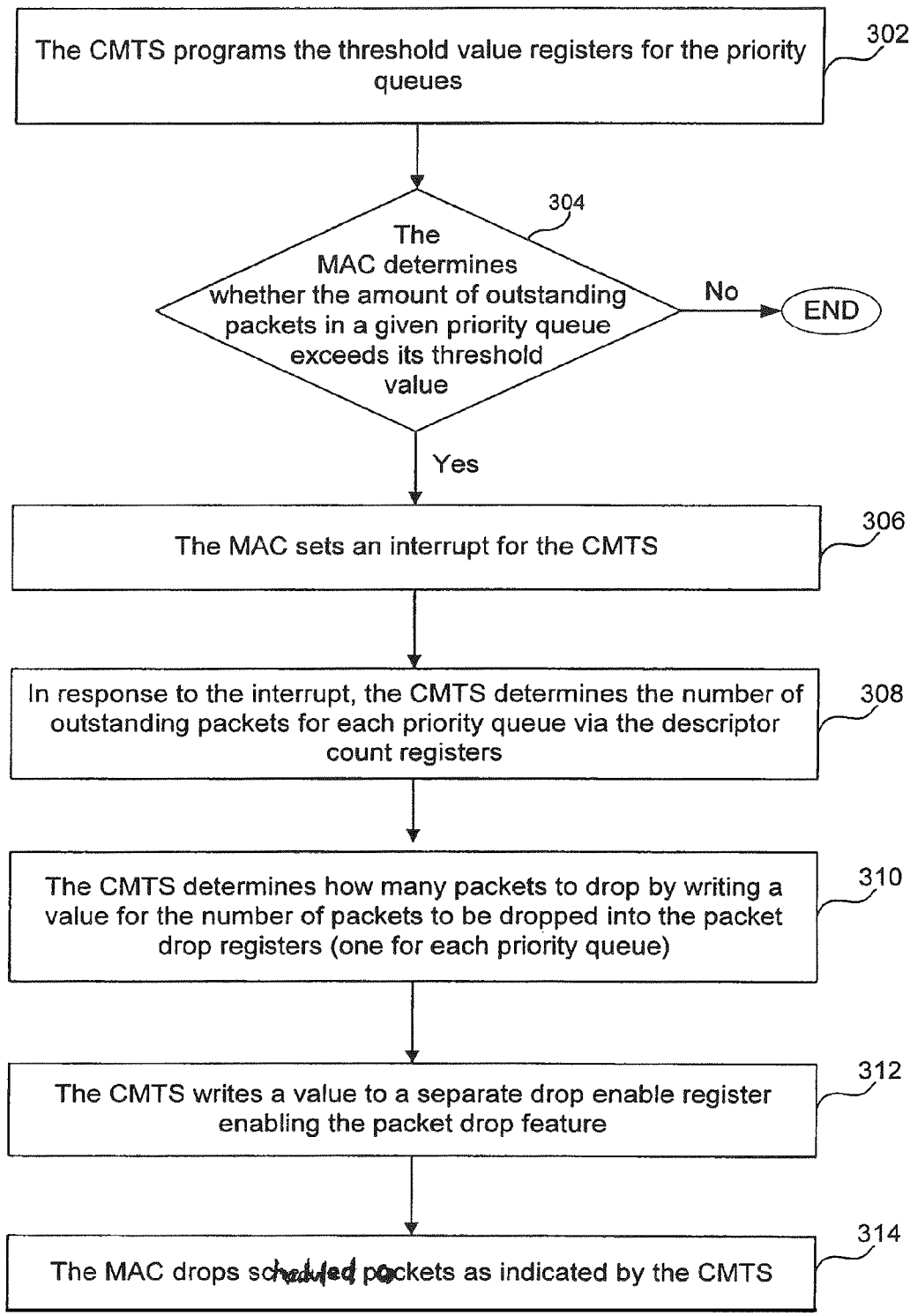
FIG. 3 is a high level flowchart that describes the efficient management of memory space by dropping lower priority packets that are slated for transmission according to an embodiment of the present invention.
Figure 4:
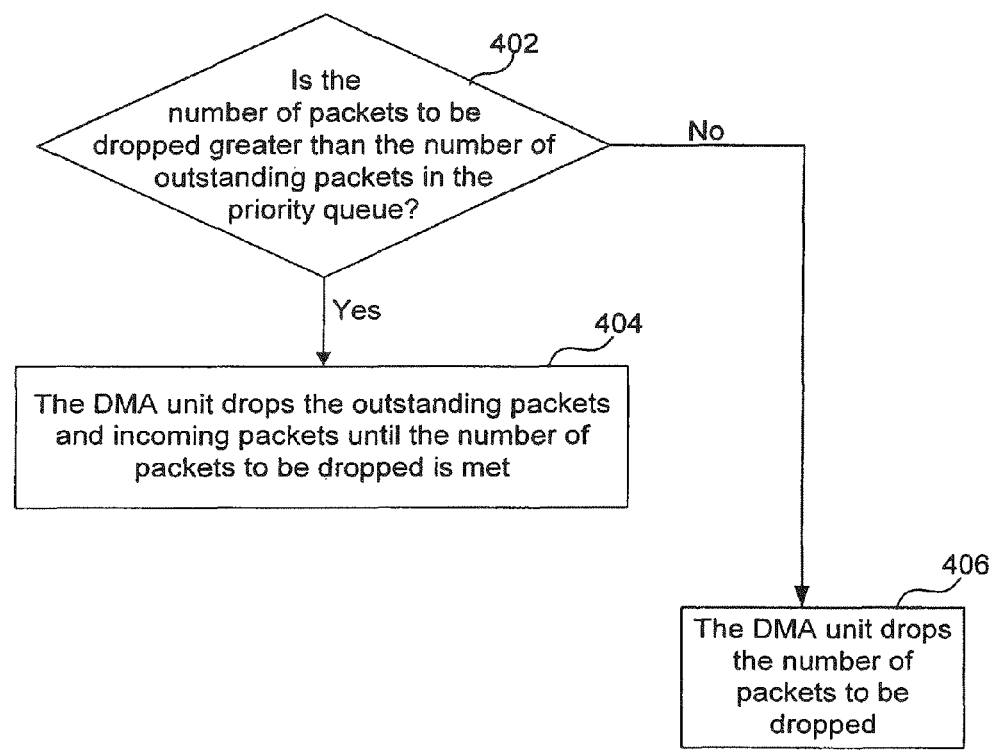

FIG. 4 describes in detail the step of dropping scheduled packets (step 314 of FIG. 3) according to an embodiment of the present invention.

Figure 5:
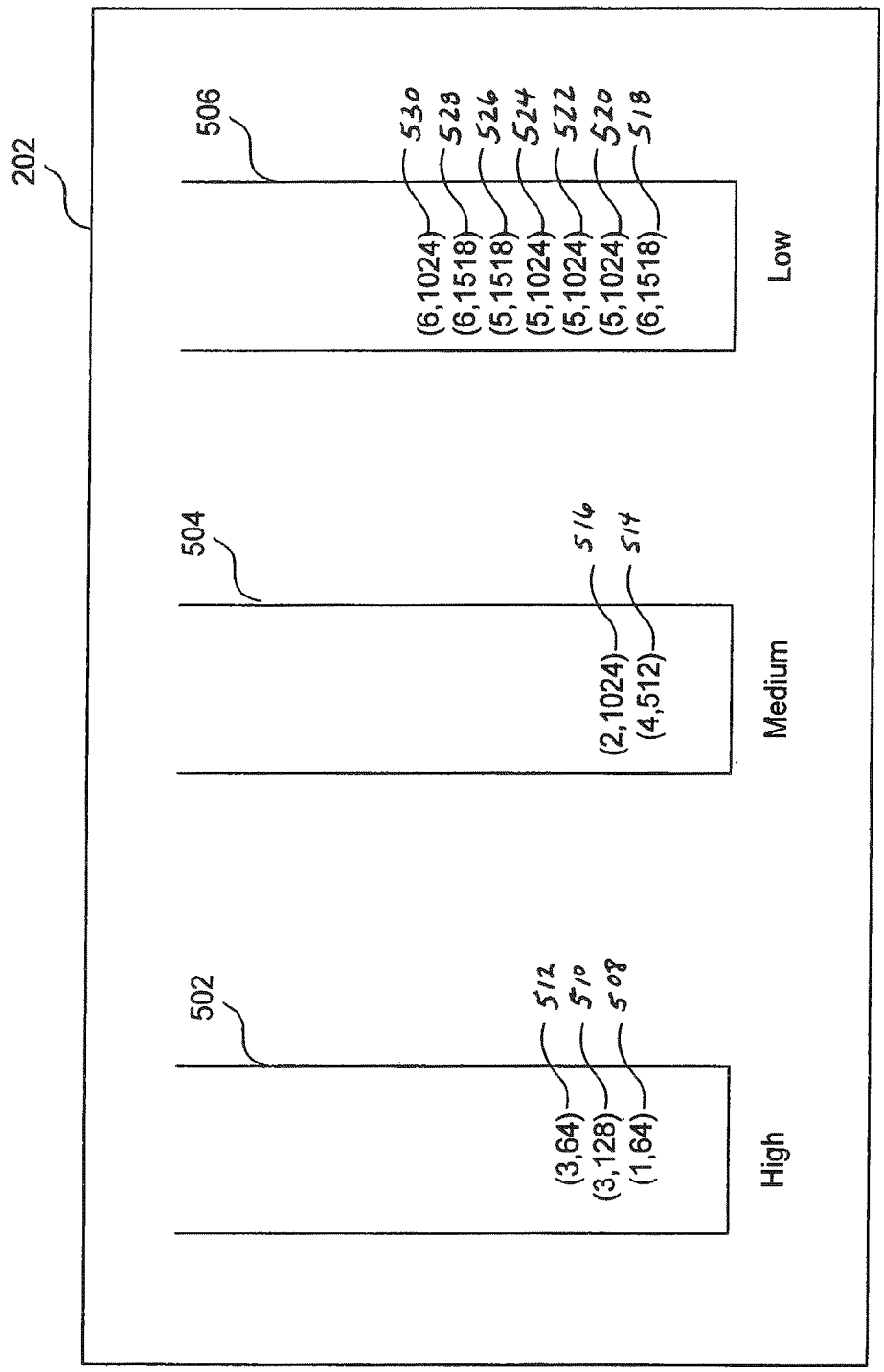

FIG. 5 illustrates three priority queues with example packets according to an embodiment of the present invention.

Figure 6:
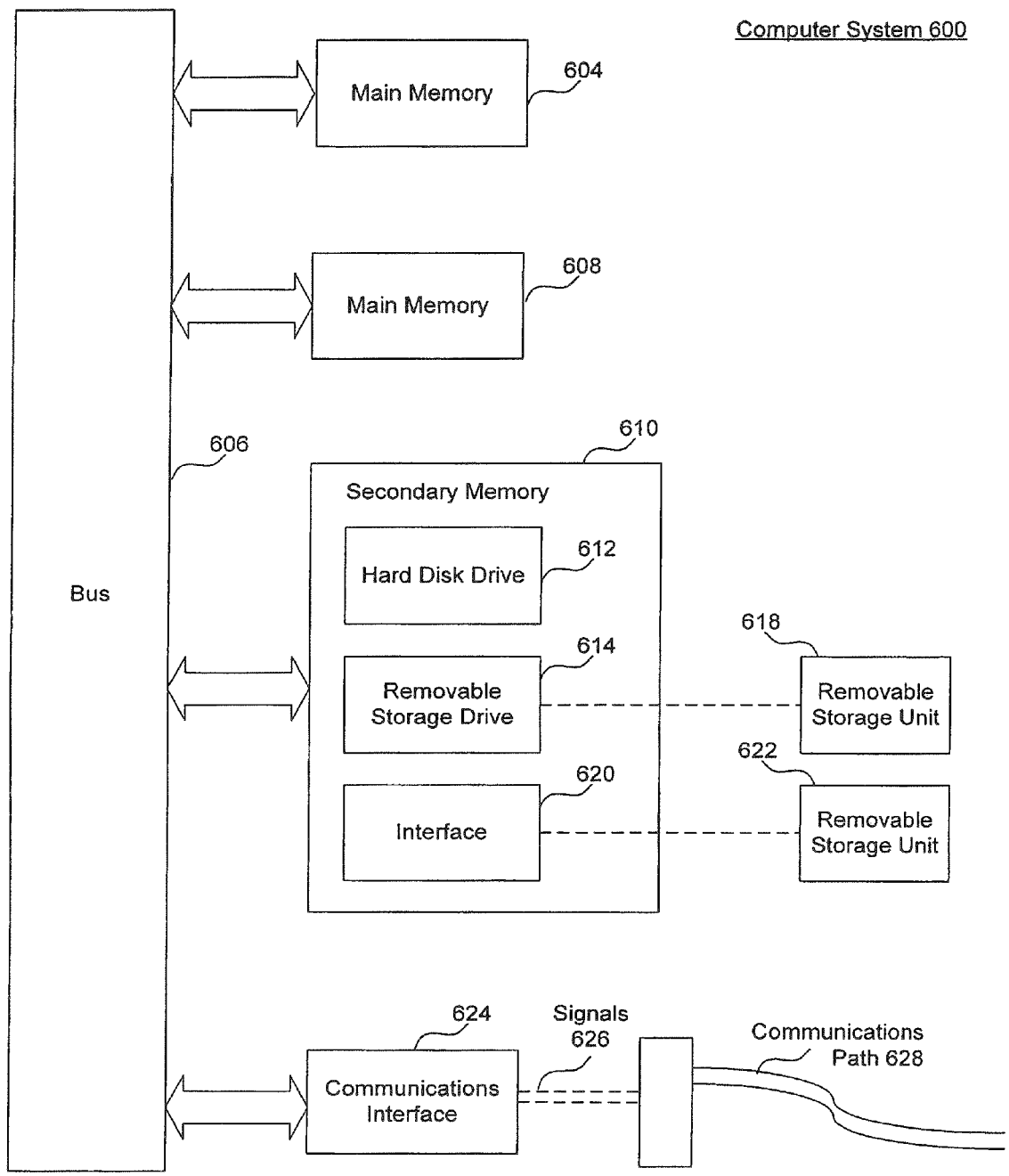

FIG. 6 illustrates an example computer used to implement the CMTS, the CMTS scheduler, the cable modem scheduler and the MAC according to an embodiment of the present invention.

DETAILED DESCRIPTION OF THE INVENTION

A. Overview of the Invention

For illustration purposes, the present invention is described in terms of being utilized with a cable network and DOCSIS. It should be understood that the present invention is independent of the actual physical layer of transmission utilized by DOCSIS (e.g., TDMA, SCDMA, etc.). It should also be understood that the present invention is not limited to use with a cable network and/or DOCSIS. In fact, the present invention may be used with any communication medium, including but not limited to, the Internet, intranets, fiber optic networks, wireless networks and satellite-based networks.

B. System Architecture Overview

Figure 1:
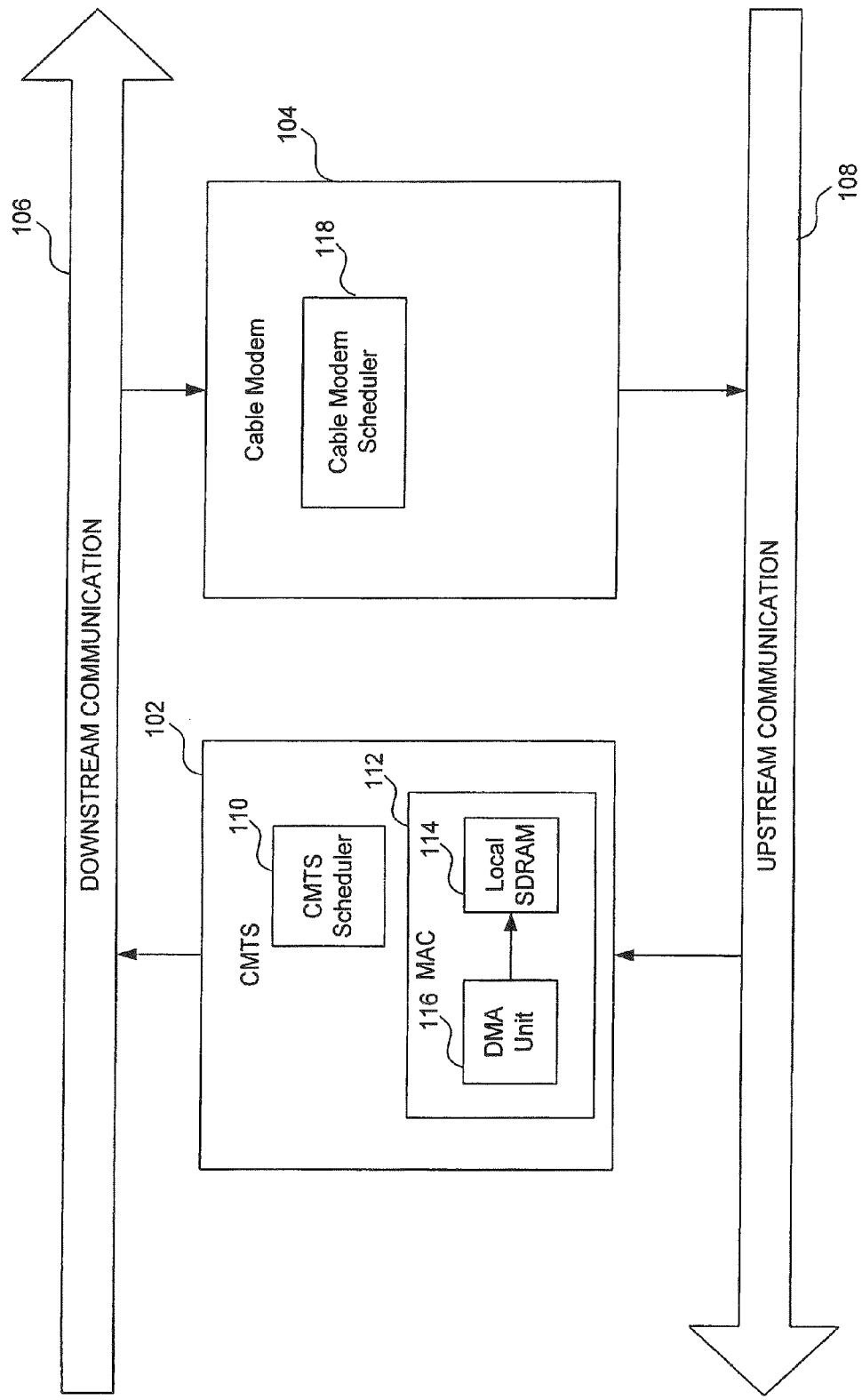
FIG. 1 is a block diagram representing an example operating environment of the present invention according to an embodiment.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a CMTS 102, a cable modem 104, downstream communication 106 and upstream communication 108, are shown. CMTS 102 further includes a CMTS scheduler 110 and a media access controller (MAC) 112. MAC 112 includes a direct memory access (DMA) unit 116 and a local SDRAM 114. Cable modem 104 includes a cable modem scheduler 118. Each of these components will be briefly described next.

In general, cable modem 104 forwards or provides data via communications on cable networks. Cable modem 104 receives data from a user that needs to be transferred via a cable network. In order to do this, cable modem 104 requests that CMTS 102 grant to it the necessary bandwidth via a packet.

As mentioned, cable modem 104 receives data from a user to be transferred via a cable network. In addition, CMTS 102 receives data from the network to be transferred to cable modem 104. Different types of data require different modes of transfer since the importance of timing is different with different types of data. For example, voice data cannot tolerate delays in its transfer. Alternatively, the type of data involved in web surfing can tolerate delays in its transfer.

In order to ensure the importance of timing is maintained, cable modem 104 assigns different priorities to different types of data. The higher the priority data has, the less of a delay that type of data will experience in its transfer via the cable network. Thus, voice data would be assigned a higher priority than data involved in web surfing.

Cable modem scheduler 118 is coupled to cable modem 104. In general, cable modem scheduler 118 is responsible for multiplexing the internal traffic, (i.e., requesting the necessary bandwidth that cable modem 104 needs to transfer its current types of data). Cable modem scheduler 118 must take into consideration the different priorities given to the current data to be transferred and to request bandwidth from CMTS 102 accordingly.

Cable modem scheduler 118 sends bandwidth requests to CMTS 102 via upstream communication 108. At a high level, each bandwidth request may include two fields. The two fields include a data provider identifier (SED) and the amount of required bandwidth. These two fields are briefly described next.

Each cable modem 104 has a unique SID. CMTS 102 uses this identifier to grant the requested bandwidth via a packet to cable modem 104. The second field is a value indicating the amount of required bandwidth needed to transfer the data. As described above, each type of data is associated with a priority. CMTS 102, CMTS scheduler 110 and MAC 112 will now be described.

CMTS 102 is a central device for connecting the cable network to a data network. CMTS scheduler 110 is a bandwidth manager. CMTS scheduler 110, as a bandwidth manager, decides how to grant available bandwidth according to the current bandwidth requests. This grant is done via a packet sent onto downstream communication 106 to cable modem 104.

MAC 112 is responsible for dropping lower priority packets that are slated for transmission to cable modem 104. MAC 112 is also responsible for transferring packets from local SDRAM 114 (via DMA unit 116) to CTMS scheduler 110. Local SDRAM 114 stores the packets. Local SDRAM 114 is described in more detail next with reference to FIG. 2. It is important to note that the present invention is not limited to using SDRAM. Other types of memory including internal SRAM, internal register space, external RAMBUS memory, DDR, and so forth, may also be used by the present invention. The present invention is explained in terms of SDRAM for illustration purposes only.

Figure 2:
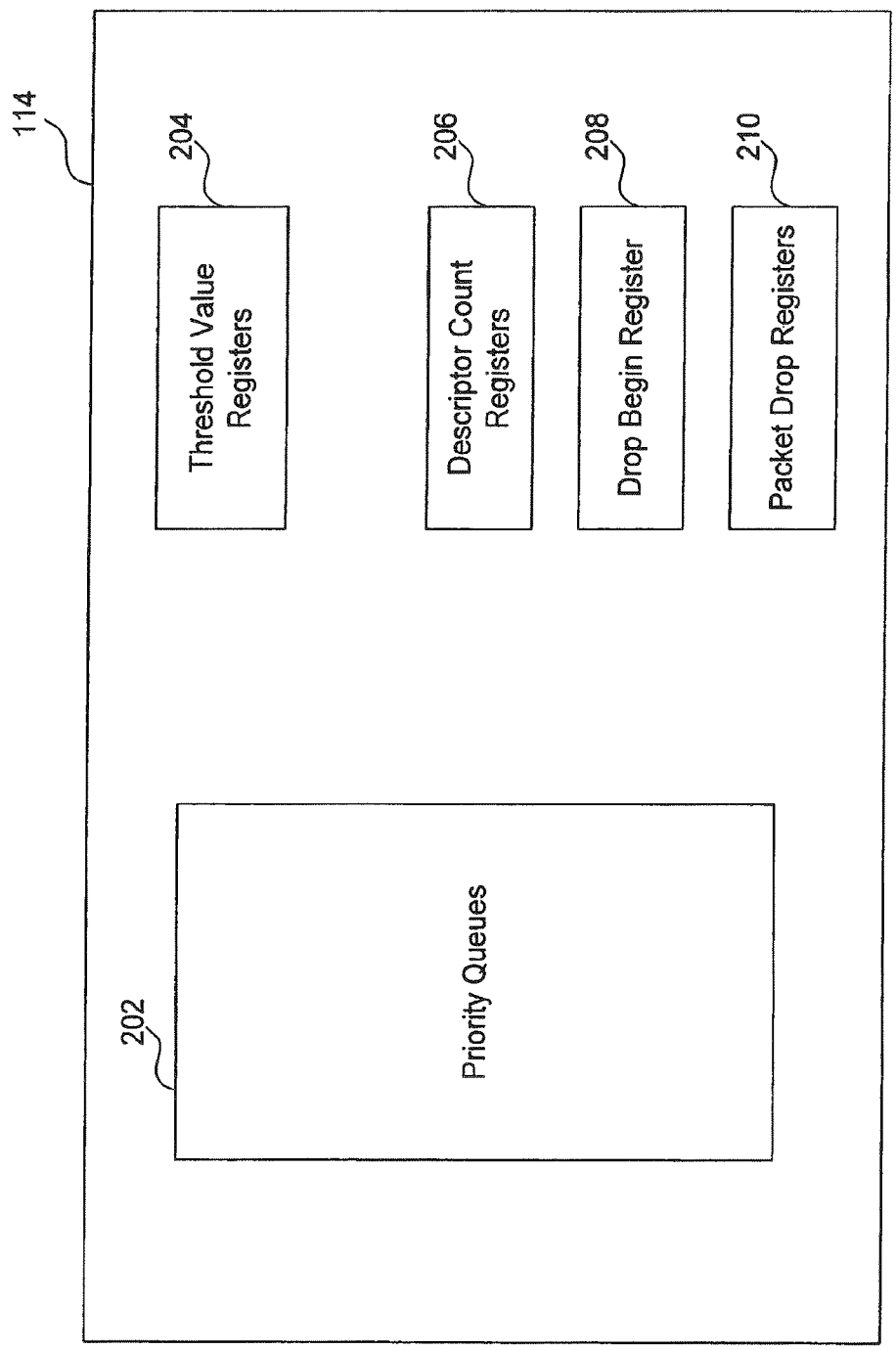
FIG. 2 illustrates the local SDRAM according to an embodiment of the present invention.

Referring to FIG. 2, local SDRAM 114 may include priority queues 202, threshold value registers 204, descriptor count registers 206, a drop begin register 208 and packet drop registers 210. In other embodiments of the invention, threshold value registers 204, descriptor count registers 206, drop begin register 208 and packet drop registers 210 are located externally to local SDRAM 114. Each of these are briefly described next.

Priority queues 202 are used to organize the received packets for bandwidth requests in such as way as to take into consideration the type of data and the order in which the packets were received.

Threshold value registers 204 include one register for each of the priority queues 202. Threshold value registers 204 represent the threshold number of packets that are allowed to be stored in its corresponding priority queue without an interrupt being sent to CMTS 102. If the threshold number is exceeded, then the present invention signals an interrupt, as will be described below with reference to FIGS. 3 and 4.

Descriptor count registers 206 also includes one register for each of the priority queues 202. Descriptor count registers 206 represent the number of outstanding packets currently stored in its corresponding priority queue.

Drop begin register 208 represents whether the packet drop feature of the present invention is activated by CMTS 102. Note that the packet drop feature of the invention may be implemented in software, hardware, hardware assist such as FPGA or ASIC, or any other way of implementing logic that is able to respond to an interrupt and determine how many packets to drop. If the packet drop feature is activated, then the present invention drops lower priority packets that are slated for transmission. Once the packet drop process is completed, drop begin register 208 is automatically cleared. The packet drop feature of the present invention is described below with reference to FIGS. 3 and 4.

Finally, packet drop registers 210 includes one register for each of the priority queues 202. Packet drop registers 210 indicate the number of packets to drop from its respective priority queue when the packet drop feature is enabled.

In an embodiment of the present invention, priority queues 202 are stored in a fixed shared memory space of local SDRAM 114. Thus, if one or more of the queues in priority queues 202 are storing many packets then these queues may be using up all of the shared memory space reserved for priority queues 202 in local SDRAM 114, and thus not allowing memory space for other queues to temporarily store packets until they are sent to cable modem 104. The present invention therefore uses threshold value registers 204 (FIG. 2) to monitor the number of packets stored in each queue and signal an interrupt when the threshold is exceeded. CMTS 102 (i.e., software in an embodiment of the invention) then uses the drop begin register 208 and packet drop registers 210 to drop lower priority packets that are slated for transmission. This frees up the fixed shared memory space, allowing for new packets to be queued or scheduled to be sent to cable modem 104. An example priority queues 202 is described next with reference to FIG. 5.

FIG. 5 illustrates three priority queues having three different priorities, namely high, medium and low. Note that the present invention is not limited to three priority queues, but may have 1 through n queues with 1 being the highest priority and n being the lowest priority.

In FIG. 5, queue 502 stores the packets with the highest priority, queue 504 stores the packets with a medium priority and queue 506 stores the packets with the lowest priority. In any event, each queue has its own priority and all packets stored in any one of the queues must have the same priority.

As illustrated in FIG. 5, queue 502 currently stores three packets, including packets 508-512. Queue 504 stores two packets, including packets 514 and 516. Queue 506 stores seven packets, including packets 518-530. Each packet is indicated as (n,m), where n is the destination SID and m is the packet length in bytes. For example, packet 508 has a priority of high, the cable modem 104 who is to receive packet 508 has a SID of 1 and packet 508 is 64 bytes in length. In addition, packet 508 arrived at CMTS 102 before packet 510, which in turn arrived before packet 512, as indicated by their positions in queue 502. It is important to note that packet 518 may arrive at CMTS 102 (e.g, WAN, Internet, intranets, fiber optic networks, wireless networks and satellite-based networks) before packet 508, but packet 508 is still likely to be sent to cable modem 104 first due to it having a higher priority. Note that the present invention also applies in the upstream with packets arriving from cable modem 104 and being sent out onto the WAN, Internet, and so forth, with low priority packets being dropped if the gateway to the WAN, Internet, and so forth, (or some other point in the path) was clogged such that queues are backed up. The operation of the present invention is described next with references to FIGS. 3 and 4.

C. Operation of the Present Invention

FIG. 3 is a high level flowchart that describes the efficient management of memory space by dropping lower priority packets that are slated for transmission according to an embodiment of the present invention. In FIG. 3, control starts at step 302. In step 302, CMTS 102 programs threshold value registers 204. As stated above, threshold value registers 204 include one register for each of the priority queues 202. Threshold value registers 204 represent the threshold number of packets that are allowed to be stored in its corresponding priority queue without an interrupt being sent to CMTS 102. Control then passes to step 304.

In step 304, MAC 112 determines whether the amount of outstanding packets in a given priority queue exceeds its threshold value. This is done by comparing the descriptor count register 206 and the threshold value register 204 for the priority queue. If the amount of outstanding packets exceeds its threshold value (i.e., is using up too much of the shared memory space in local SDRAM 114 that is reserved for priority queues 202), then control passes to step 306. Alternatively, the flowchart in FIG. 3 ends.

In step 306, MAC 112 sets an interrupt for CMTS 102. When the interrupt is set it indicates to CMTS 102 that local SDRAM 114 is getting full and some lower priority packets should be dropped in order to guarantee there will be enough memory to store higher priority packets. Control then passes to step 308.

In step 308, in response to the interrupt, CMTS 102 checks the status of priority queues 202 by determining the number of outstanding packets for each priority queue 202 via descriptor count registers 206. Control then passes to step 310.

In step 310, CMTS 102 makes a decision on the best way to drop packets from the lower priority queues and, if applicable, the number of packets to drop so as to guarantee that the packets that get dropped are in fact lower priority packets and that there is enough memory available for higher priority packets. Once CMTS 102 makes the decision, CMTS 102 indicates the number of packets to drop by writing a value for the number to drop into the appropriate packet drop register 210. As stated above, packet drop registers 210 includes one register for each of the priority queues 202. Packet drop registers 210 indicate the number of packets to drop from its respective priority queue when the packet drop feature is enabled. Control then passes to step 312.

In step 312, CMTS 102 writes a value to drop begin register 208 indicating that the packet drop feature of the invention is enabled. Control then passes to step 314.

In step 314, it has been determined by the present invention that local SDRAM 114 is getting full. Here, MAC 112 drops scheduled lower priority packets as indicated by CMTS 102. This frees up the fixed shared memory space, allowing for new packets to be queued or scheduled to be sent to cable modem 104. The flowchart in FIG. 3 ends at this point. How MAC 112 drops scheduled packets as indicated by CMTS 102 is described in more detail next with reference to FIG. 4.

In FIG. 4, control starts at step 402. In step 402, it is determined whether the number of packets to be dropped is greater than the number of outstanding packets for a particular priority queue. If so, then control passes to step 404. Alternatively, control passes to step 406.

In step 404, DMA unit 116 drops all of the outstanding packets in the relevant priority queue and continues to drop incoming packets until the number of packets to be dropped is met. For example, in FIG. 5, if the number of outstanding packets to be dropped from queue 506 is eight, then DMA unit 116 would start with the oldest packet (packet 518) and drop packets 518 through 530 (seven packets total). DMA unit 116 would then drop the next packet that is stored in queue 506 to make the total number of packets dropped from queue 506 equal eight.

In step 406, DMA unit 116 drops the number of packets in the relevant priority queue as indicated by the corresponding packet drop register. The flowchart in FIG. 4 ends at this point.

D. Example Environment of the Present Invention

CMTS 102, CMTS scheduler 110, cable modem scheduler 118 and MAC 112 may be implemented using computer 600 as shown in FIG. 6. Obviously, more than one of these functional components could be implemented on a single computer 600.

The present invention may be implemented using hardware, software or a combination thereof and may be implemented in a computer system or other processing system. In fact, in one embodiment, the invention is directed towards one or more computer systems capable of carrying out the functionality described herein. The computer system 600 includes one or more processors, such as processor 604. The processor 604 is connected to a communication bus 606. Various software embodiments are described in terms of this example computer system. After reading this description, it will become apparent to a person skilled in the relevant art how to implement the invention using other computer systems and/or computer architectures.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 618, a hard disk installed in hard disk drive 612, and signals 626. These computer program products are means for providing software to computer system 600.

Computer programs (also called computer control logic) are stored in main memory and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

E. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for dropping lower priority packets that are slated for transmission over a wireless communication medium, comprising:
   receiving a plurality of packets to be transferred over the wireless communication medium;
   storing the plurality of packets in a plurality of priority queues in a fixed shared memory space based on an order in which the plurality of packets are received and based on priorities associated with the plurality of packets;
   signaling an interrupt when a packet threshold is exceeded in one of the plurality of priority queues; and
   in response to the interrupt being signaled, dropping a portion of the plurality of packets stored in a at least two of the plurality of priority queues to make available additional memory space in the fixed shared memory space.

2. The method of claim 1, wherein all, packets stored in the one of the plurality of priority queues have the same priority.

3. The method of claim 1, wherein the interrupt indicates that the portion of the plurality of packets is to be dropped.

4. The method of claim 1, wherein the portion of the plurality of packets is determined based on the order in which the plurality of packets are received.

5. A system for dropping lower priority packets slated for transmission over a wireless communication medium, comprising:
   a first priority queue, among a plurality of priority queues in a fixed shared memory space, configured to store packets with a first priority;
   a threshold value register configured to indicate a number of packets permitted to be stored in the first priority queue;
   a descriptor count register configured to indicate a number of packets stored in the first priority queue; and
   a media access controller configured to monitor the threshold value register and the descriptor count register and signal an interrupt when the number of packets stored in the first priority queue is at or exceeds the number of packets permitted to be stored in the first priority queue,
   wherein in response to the interrupt being signaled, at least some of the packets with the priority stored in the first priority queue and other packets stored in other ones of the plurality of priority queues are dropped to make available additional memory space in the fixed shared memory space.

6. The system of claim 5, wherein the first priority queue maintains an order in which the packets with the first priority are received.

7. The system of claim 6, wherein the at least some of the packets with the first priority is determined based on the order in which the packets with the first priority are received.

8. The system of claim 5, further comprising:
   a packet drop register configured to store a number of packets to drop from the first priority queue in response to the interrupt being signaled.

9. The system of claim 5, further comprising:
   a drop begin register configured to indicate when packets are to be dropped from the plurality of priority queues.

10. The system of claim 5, wherein all packets stored in the first priority queue have the same priority.

11. A method comprising:
    storing a plurality of packets in a plurality of priority queues in a fixed shared memory space based on an order in which the plurality of packets are received and based on priorities associated with the plurality of packets;
    monitoring a number of packets in one of the plurality of priority queues;
    signaling an interrupt when a packet threshold is exceeded in the one of the plurality of priority queues; and
    in response to the interrupt being signaled, dropping a portion of the plurality of packets stored in at least two of the plurality of priority queues.

12. The method of claim 11, wherein the plurality of packets is to be transferred over a wireless communication medium.

13. The method of claim 11, wherein the portion of the plurality of packets stored in the at least two of the plurality of priority queues is dropped to make available additional memory space in the fixed shared memory space.

14. The method of claim 11, wherein the portion of the plurality of packets stored in the at least two of the plurality of priority queues is dropped to make available additional memory space in the fixed shared memory space for higher priority packets.

15. The method of claim 11, wherein all packets stored in the one of the plurality of priority queues have the same priority.

16. The method of claim 11, wherein the interrupt indicates that the portion of the plurality of packets is to be dropped.

17. The method of claim 11, wherein the portion of the plurality of packets is determined based on an order in which the plurality of packets are received.

* * * * *

UNITED STATES PATENT AND TRADEMARK OFFICE
CERTIFICATE OF CORRECTION

PATENT NO.       : 8,593,966 B2
APPLICATION NO.  : 13/018411
DATED            : November 26, 2013
INVENTOR(S)      : Shane Lansing Page 1 of 1

It is certified that error appears in the above-identified patent and that said Letters Patent is hereby corrected as shown below:

In the Claims

Claim 1, Column 8, line 6 replace "stored in a at least" with --stored in at least--.

Claim 2, Column 8, line 10 replace "wherein all, packets" with --wherein all packets--.

Claim 5, Column 8, line 33 replace "wherein in response" with --wherein, in response--.

Claim 5, Column 8, line 34 replace "with the priority" with --with the first priority--.

Signed and Sealed this
Twenty-fifth Day of February, 2014

Michelle K. Lee
*Deputy Director of the United States Patent and Trademark Office*